United States Patent [19]

Siegenthaler

[11] Patent Number: 5,211,797
[45] Date of Patent: May 18, 1993

[54] TIRE BUILDING DRUM WITH INNERSTITCHING DEVICE

[75] Inventor: Karl J. Siegenthaler, Ostia, Italy

[73] Assignee: Bridgestone/Firestone, Inc., Akron, Ohio

[21] Appl. No.: 832,143

[22] Filed: Feb. 6, 1992

[30] Foreign Application Priority Data

Mar. 26, 1991 [IT] Italy .............................. TO91A 000212

[51] Int. Cl.$^5$ .............................................. B29D 30/26
[52] U.S. Cl. ...................................... 156/408; 156/415; 156/421.6
[58] Field of Search ............... 156/408, 421, 421.6, 156/130.3, 416–420, 409–415, 398–402

[56] References Cited

U.S. PATENT DOCUMENTS

| | | |
|---|---|---|
| 2,915,108 | 12/1959 | Antraigue ...................... 156/408 X |
| 3,560,302 | 2/1971 | Missioux . |
| 3,645,826 | 2/1972 | Henley et al. . |
| 3,816,218 | 6/1974 | Felten . |
| 4,010,058 | 3/1977 | Kubinski et al. . |
| 4,302,274 | 11/1981 | Enders ............................. 156/401 |
| 5,120,390 | 6/1992 | Klose et al. ...................... 156/398 X |

FOREIGN PATENT DOCUMENTS

| | | |
|---|---|---|
| 0071840 | 2/1983 | European Pat. Off. . |
| 0278892 | 8/1988 | European Pat. Off. . |
| 1906023 | 8/1970 | Fed. Rep. of Germany . |
| 45-28499 | 9/1970 | Japan . |

Primary Examiner—Geoffrey L. Knable
Attorney, Agent, or Firm—David A. Thomas

[57] ABSTRACT

A tire building device wherein a unistage drum (6) includes an inner shaft (7) having an intermediate portion fitted with an innerstitching device (11), and two end portions located on opposite sides of the innerstitching device (11) and supporting two half drums (12,13) connected to the inner shaft (7) via the interposition of respective slides (18), each of which is connected, in one instance, in a sliding and angularly fixed manner to the inner shaft (7), and, in another, in a rotary manner to the respective half drum (12)(13) which may be locked in relation to the respective slide (18) by means of a friction coupling (53).

6 Claims, 3 Drawing Sheets

TIRE BUILDING DRUM WITH INNERSTITCHING DEVICE

TECHNICAL FIELD

The present invention relates to a tire building device.

BACKGROUND OF THE ART

In particular, the present invention relates to a tire building device of the type including a unistage drum in turn including an inner shaft; two half drums mounted in a sliding manner on the inner shaft and designed to move in relation to each other between an open idle position and a closed operating position; expandable clamping means on each half drum for clamping a respective bead; and a number of annular bladders on each half drum, selectively inflatable with pressurized fluid.

Co-pending U.S. patent application Ser. No. 07/832,158, filed concurrently herewith and which is incorporated herein by reference in the interest of full disclosure, pertains to a method and device for joining stratified or layered tire portions or components by means of an innerstitching operation, during which the inner carcass of a green tire and the outer tread belt are assembled together inside a fixed stitching mold, in one embodiment, by rotating stitching devices over the inner surface of the carcass. The stitching devices push the carcass radially outwardly so as to adhere perfectly to the tread belt, which in turn is pushed against the inner surface of the mold in contact with which the finished green tire is accurately formed.

SUMMARY OF THE INVENTION

It is an object of the present invention to provide a tire building device of the aforementioned type enabling the assembly of a stitching device as described in previously noted co-pending U.S. patent application Ser. No. 07/832,158, and enabling innerstitching of the carcass to be performed directly on the tire building drum, i.e. without removing the carcass.

According to the present invention, there is provided a tire building device including a unistage tire building drum in turn including an inner shaft; two half drums coaxial with said inner shaft and designed to move along same and in relation to each other between an open idle position and a closed operative position; expandable clamping means on each of said half drums for clamping a respective bead; and a number of annular bladders on each said half drum, selectively inflatable with pressurized fluid; characterized by the fact that it also includes inner stitching means between said half drums and fitted onto said inner shaft so as to rotate with same; and slide means between each of said half drums and said inner shaft; each of said slide means being connected to said inner shaft in a sliding and angularly fixed manner; each of said half drums being connected for rotation to said respective slide means so as to rotate in relation to same about the axis of said inner shaft; and connecting means being provided between each of said half drums and said respective slide means, and being selectively operatable for angularly locking said half drum to said respective slide means.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
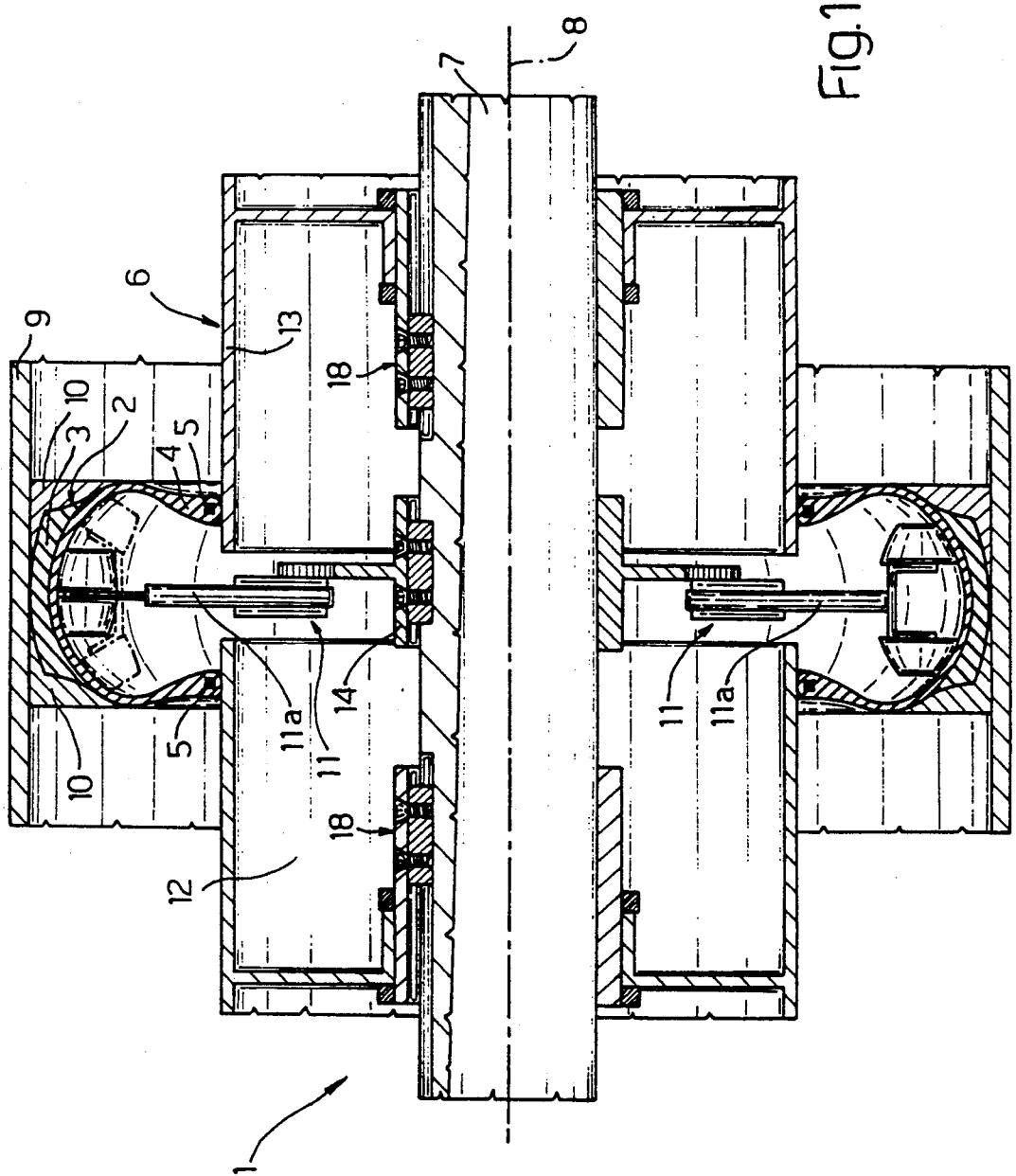
FIG. 1 shows a schematic view, substantially in block diagram-type form, of a preferred embodiment of a tire building device in accordance with the present invention.

Number 1 in FIG. 1 indicates a unit or drum for building a green tire 2 including a tread belt 3 and an inner carcass 4 with two metal beads 5. Unit 1 includes a tire building device consisting of a tire building drum 6 extending through the inner diameter of tire 2 and in turn comprising a driven hollow inner shaft 7 turning about its axis 8, and a tubular body 9 outside drum 6 and coaxial with axis 8.

The inner surface of tubular body 9 is fitted with a toroidal body open along its inner edge and constituting a stitching mold 10 for tire 2, the latter being described in detail in co-pending U.S. patent application Ser. No. 07/832,112 filed concurrently herewith and which is incorporated herein by reference in the interest of full disclosure.

Unit 1 also includes an inner stitching device 11 constituting a portion of drum 6, supported on an intermediate portion of shaft 7, and having stitching elements 11a designed to move radially, in relation to shaft 7, between a withdrawn idle position wherein elements 11a are housed inside drum 6, and an extracted operating position wherein elements 11a engage the inner surface of green tire 2. Stitching device 11 forms the object of previously noted U.S. patent application Ser. No. 07/832,158.

Figure 2:
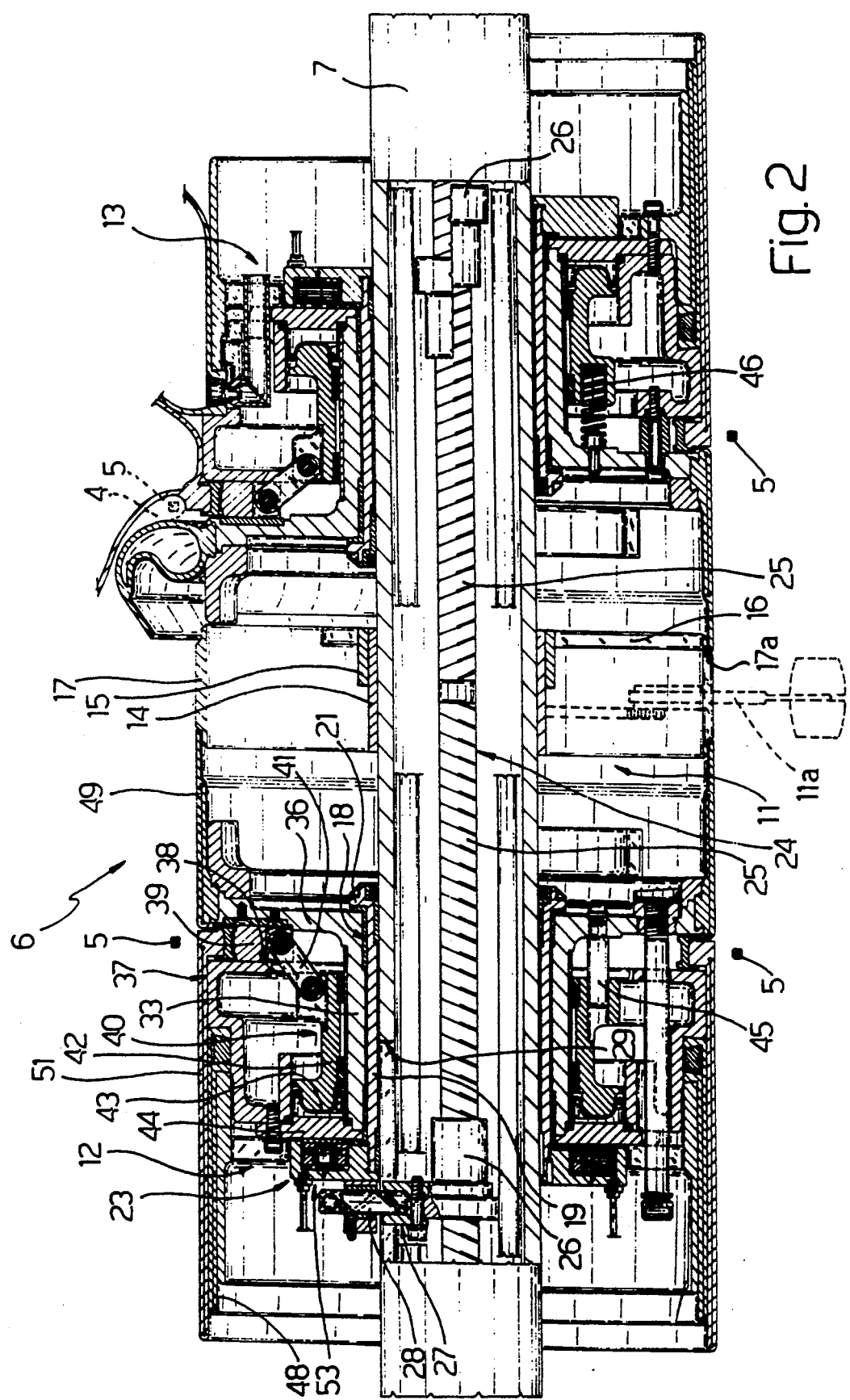
FIG. 2 shows a section of a preferred embodiment of a FIG. 1 detail in two different operating positions.

As shown in FIG. 2, drum 6 includes two hollow cylindrical half drums 12 and 13 mounted on shaft 7 on opposite sides of a coupling 14 fitted onto an intermediate portion of shaft 7 and in turn fitted with device 11. An outer surface portion of coupling 14 is connected for rotation to the inner surface of a further coupling 15, from the outer edge of which a number of radial brackets 16 extend outwardly. The outer end of each bracket 16 is connected to the inner surface of an intermediate annular body 17 having an inside diameter greater than the outside diameter of half drums 12 and 13, and having a number of openings 17a engaged, in use, by elements 11a of device 11 in said extracted position.

As half drums 12 and 13 are substantially identical, the following description will be limited solely to half drum 12, and any parts thereof that are not shown will be referred to using the corresponding parts (if shown) of half drum 13. As shown in FIG. 2 and particularly in FIG. 3 half drum 12 is connected to shaft 7 by a respective slide 18 comprising a cylindrical tubular body 19 coaxial with shaft 7 and connected to the outer surface of shaft 7 by means of two annular shoes 20. Tubular body 19 has an outer annular flange 21 on a first end facing coupling 14, and, on the second end opposite the first, an outer thread 22 engaged by the inner thread of an annular body 23 extending radially outwardly from the outer surface of tubular body 19.

Shaft 7 has fitted within its hollow interior a power screw 24 having two oppositely directed threaded portions 25, one for each of slides 18. Each threaded portion 25 is fitted with a nut screw 26 having a gripping device 27 on the outside thereof for locking the end of a respective radial pin 28 extending outwardly through a respective axial opening 29 formed through shaft 7. Pin 28 has a number of helical outer grooves 30 forming part of a known quick-fit device enabling rapid assembly of pin 28 through a radial hole 31 formed through an appendix 32 extending axially outwardly from the axial surface of annular body 23 opposite that facing flange 21. Thus, when screw 24 is rotated, nut screw 26 is axially displaced without rotating, thus resulting in displacement of pin 28 along respective opening 29, and displacement of slide 18, which is prevented from rotating about axis 8 by pin 28 engaging opening 29.

Half drum 12 is mounted on the portion of slide 18 extending between flange 21 and annular body 23, and includes a coupling 33 coaxial with tubular body 19 and connected for rotation to the outer surface of tubular body 19 via the interposition of two annular shoes 34 and 35. From the inner axial end of coupling 33, i.e. the end facing flange 21, there extends radially outwardly a flat annular wall 36, the outer edge of which is fitted integrally with the intermediate portion of a tubular body 37 extending axially outwardly from and coaxially with coupling 33.

Tubular body 37 has a number of radial through openings, each forming the outlet of a radial chamber 38 housing a respective piston 39 in the form of a circular sector forming part of a clamping device 40 for a respective bead 5 (FIG. 2). For each piston 39, device 40 includes a connecting rod 41 between piston 39 and a tubular piston 42 common to all of connecting rods 41 and mounted so as to slide in contact with the outer surface of coupling 33 by virtue of a variable-volume bladder 43 supported on a flat annular wall 44 extending outwardly from the outer end of coupling 33. Bladder 43 is connected (in manner not shown) to a compressed air supply (not shown) for axially displacing piston 42 to and from flange 21, and thus displacing pistons 39 to and from an extracted position wherein a respective bead 5 is clamped to respective half drum 12. As shown in FIG. 2, piston 42 is prevented from rotating on coupling 33 by an axial pin 45 mounted in a sliding manner through piston 42 and integral with wall 36. The return movement of piston 42, following a reduction in pressure inside bladder 43, is assured by a number of springs 46 (FIG. 2) compressed between wall 36 and piston 42.

The outer surface of tubular body 37 is fitted with the beads 47 of two annular bladders 48 and 49 located on opposite sides of the ring of pistons 39, which support the annular bead 50 of a third bladder 51 lying, when idle, over bladder 48.

Figure 3:
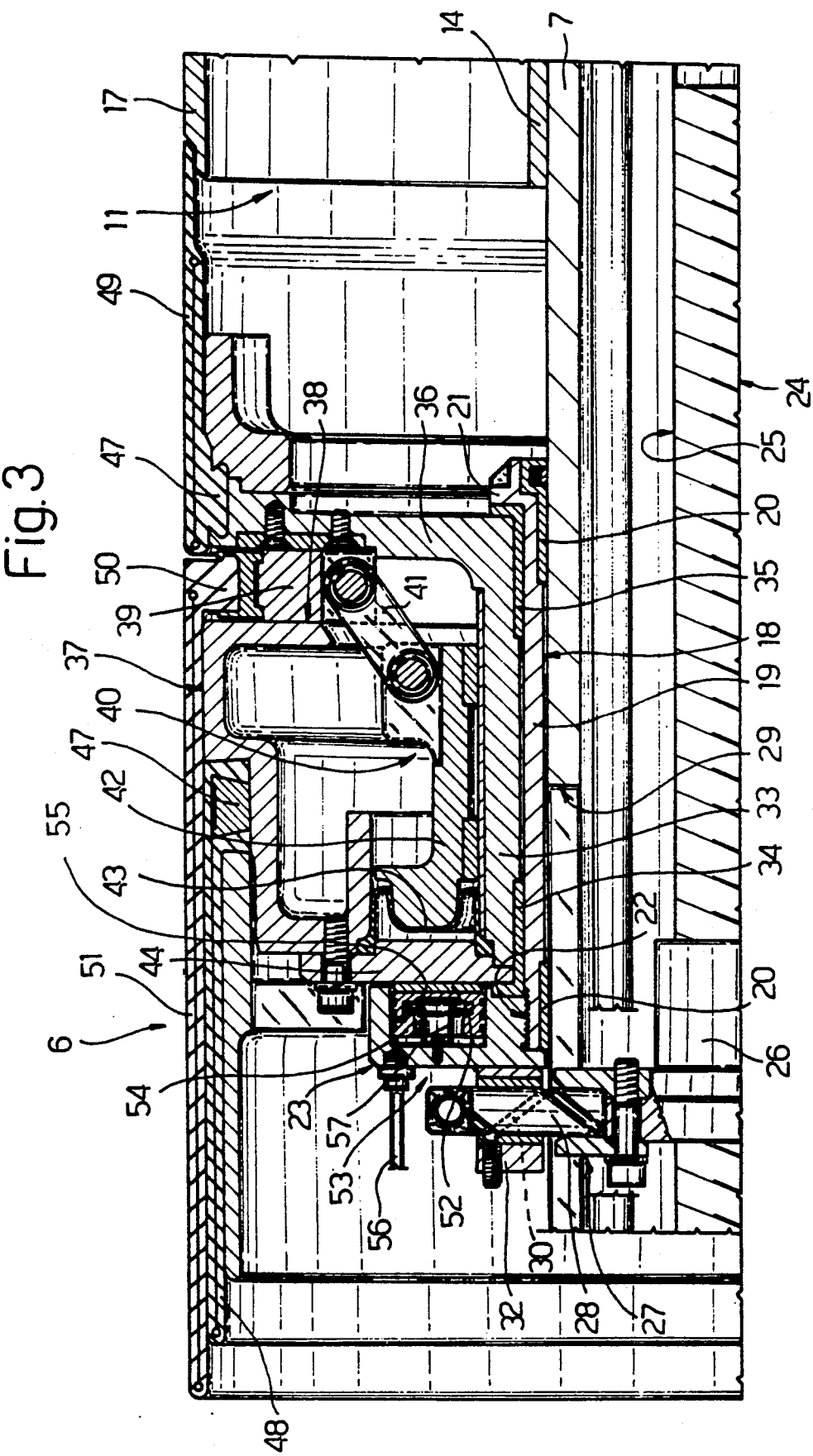
FIG. 3 shows a larger-scale axial section of a detail in FIG. 2

As shown in FIG. 3, the outer surface of wall 44 is fitted integrally with a friction ring or pad 52 of a friction coupling, such as a clutch or brake for example, indicated as a whole by 53 and including, in addition to ring 52, an annular piston 54 mounted in a sliding manner inside an annular chamber 55 formed in the surface of annular body 23 facing wall 44 and coaxial with axis By means of compressed air fed into chamber 55 via duct 56, piston 54 is moved axially, against the action of springs 57, into a position frontally contacting ring 52 and wherein half drum 12 is locked angularly in relation to slide 18.

In operation, screw 24 is rotated to set drum 6 to the idle position shown in the bottom half of FIG. 2, wherein half drums 12 and 13 are open. Drum 6 is then loaded in a known manner with the body plies (not shown) of carcass 4, and with beads 5 which are fitted outside pistons 39 of respective clamping devices 40 and clamped in a known manner onto the body plies by the activation of devices 40.

When clamping device 40 is activated, pistons 39 are displaced radially outwardly in a known manner to clamp beads 5 into position. Compressed air is then fed into bladders 48, 49 and 51 to turn the outer portions (not shown) of the body plies up and around beads 5 and commence the building of carcass 4, which is done by activating screw 24, simultaneously with activating the compressed air supply, to set half drums 12 and 13 to the closed operating position.

During the building or assembly of carcass 4, tubular body 9 is moved up to drum 6 so as to position stitching mold 10, which houses tread belt 3, outside and around drum 6 for receiving carcass 4 which, as it is being built, expands radially outwardly until it eventually touches and then adheres to the inner surface of tread belt 3 and is locked angularly in relation to mold 10.

At this time, friction couplings 53, which were formerly locked, are released to enable half drums 12 and 13 to rotate in relation to respective slides 18 and about axis 8. Subsequently, as described in previously noted co-pending U.S. patent application Ser. No. 07/832,158, rotation of shaft 7 results first in the extraction of elements 11a through openings 17a (FIG. 2) and, secondly, in the innerstitching of carcass 4 in contact with tread belt 3 and the inner surface of mold 10 so as to produce a finished green tire 2, which is maintained stationary by mold 10 throughout the innerstitching operation as it is being performed by device 11. The presence of slides 18, of the rotary connection between half drums 12 and 13 and slides 18, and of friction couplings 53 therefore provides, on the one hand, when couplings 53 are locked, for producing carcass 4 in a known and absolutely standard manner, and, on the other, when couplings 53 are released, for innerstitching tire 2 by maintaining tire 2 stationary and rotating shaft 7 about its axis.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A tire building device including a unistage drum in turn including an inner shaft; two half drums coaxial with said inner shaft and movable along same and in relation to each other between an open idle position and a closed operative position; expandable clamping means on each of said half drums for clamping a respective bead; and a number of annular bladders on each of said half drums, selectively inflatable with pressurized fluid; characterized by the fact that it also includes inner-stitching means between said half drums and fitted onto said inner shaft so as to rotate with same; and slide means between each of said half drums and said inner shaft; each of said slide means being connected to said inner shaft in a sliding and angularly fixed manner; each of said half drums being connected for rotation to said respective slide means so as to rotate in relation to same about the axis of said inner shaft; and connecting means being provided between each of said half drums and said respective slide means, and being selectively operatable for angularly locking said half drum to said respective slide means.

2. A device as claimed in claim 1, characterized by the fact that it also includes a control device for moving said slide means along said inner shaft, together with said respective half drums, between said open and closed positions; said control device comprising, for each said slide means, a screw element coaxial with and housed inside said inner shaft, and a nut screw connected to said screw element; with connecting means being provided for connecting said nut screw to said respective slide means.

3. A device as claimed in claim 2, characterized by the fact that, for each of said connecting means between said nut screw and said respective slide means, said inner shaft has an axial guide opening engaged in a sliding manner with said connecting means.

4. A device as claimed in claim 3, characterized by the fact that each of said slide means comprises a tubular body coaxial with said axis connected in a sliding manner to the outer surface of said inner shaft.

5. A device as claimed in claim 4, characterized by the fact that each of said half drums includes a cylindrical inner coupling coaxial with said axis connected to the outer surface of said tubular body so as to rotate about said axis.

6. A device as claimed in claim 5, characterized by the fact that said connecting means between each of said half drums and said respective slide means comprises a releasable friction coupling.

* * * * *